United States Patent [19]
Chen

[11] Patent Number: 5,778,196
[45] Date of Patent: Jul. 7, 1998

[54] METHOD AND DEVICE FOR IDENTIFYING A BUS MEMORY REGION

[75] Inventor: An-Chung Chen, Ping-Tung, Taiwan

[73] Assignee: Acar Laboratories, Incorporated, Taipei, Taiwan

[21] Appl. No.: 394,337

[22] Filed: Feb. 24, 1995

[51] Int. Cl.$^6$ .................................................. G06F 13/00
[52] U.S. Cl. .................. 395/284; 395/402; 395/497.01; 395/829
[58] Field of Search ...................... 395/284, 281, 395/282, 283, 402, 405, 497.01, 497.02, 497.03, 497.04; 370/85.13

[56] References Cited

U.S. PATENT DOCUMENTS

| | | | |
|---|---|---|---|
| 4,597,078 | 6/1986 | Kempf | 370/85.13 |
| 5,079,771 | 1/1992 | Shimada | 371/43 |
| 5,119,486 | 6/1992 | Albonesi | 395/497.03 |
| 5,210,850 | 5/1993 | Kelly et al. | 395/727 |
| 5,329,527 | 7/1994 | Ujihashi et al. | 370/85.13 |
| 5,371,868 | 12/1994 | Koning et al. | 395/410 |
| 5,392,407 | 2/1995 | Heil et al. | 395/293 |
| 5,426,739 | 6/1995 | Lin et al. | 395/309 |
| 5,446,869 | 8/1995 | Padgett et al. | 395/500 |
| 5,467,295 | 11/1995 | Young et al. | 395/200.05 |
| 5,559,965 | 9/1996 | Oztaskin et al. | 395/284 |

*Primary Examiner*—Gopal C. Ray
*Assistant Examiner*—Paul R. Myers
*Attorney, Agent, or Firm*—Townsend and Townsend and Crew LLP

[57] ABSTRACT

A method for identifying a bus memory region in a dynamic manner that is cost effective and suitable for plug-and-play systems is provided. The method includes the steps of a) identifying first signals that initiate a bus cycle, the first signals specifying a first address in the memory region; b) storing the first address as a reference address for the memory region; c) receiving second signals specifying an operation and a second address; d) comparing the second address with the reference address; and e) proceeding with the operation on the bus if the comparing step confirms the second address references the memory region. A device according to the present invention may include a bus-cycle discriminator, a latch, a comparing device, and a controller which allows the bus memory region to be identified without any change to the hardware even when the memory segments of the relevant bus changes.

14 Claims, 7 Drawing Sheets

1

METHOD AND DEVICE FOR IDENTIFYING A BUS MEMORY REGION

FIELD OF THE INVENTION

The present invention is related to a method and a device for identifying a memory region and, more particularly, to a method and a device for identifying a memory region for a specific bus.

BACKGROUND OF THE INVENTION

FIG. 1 is a schematic block diagram showing a conventional parallel bus personal computer system which includes a CPU 11 (e.g., 486 microprocessor), a VESA (Video Electronics Standards Association) bus 12, a PCI (Peripheral Component Interconnect) bus 13, a PCI bridge 14, an ISA (Industry Standard Architecture) bus 15, an ISA controller 16 and a main memory 17. The PCI bus 13 includes memory segments 131 and 132. The PCI bridge 14 is used as an interface between CPU 11 and PCI bus 13 converting a signal outputted by CPU 11 into a form acceptable by PCI bus 13. In a conventional data-processing system, in order for the CPU to initiate a cycle on a specific bus, the CPU has to output signals to a local bus first. For example, FIG. 2 is a timing diagram showing signals transmitted from CPU 11 when the CPU is going to initiate a cycle on PCI bus 13. CPU 11 first outputs a signal CPU-ADS to PCI bridge 14 to query whether the CPU is going to initiate a cycle of main memory 17. The time represented by point A in FIG. 2 is the deadline for checking whether the relevant signal initiates a cycle of main memory 17. If not, bridge 14 will check a signal VESA-LDEV coming from a VESA device to determine if the signal belongs to the VESA device. The timing of this check, points V1, V2 and V3, are selected according to the response rate of the VESA device. Bridge 14 can be programmed to have either the time point V1, V2 or V3 selected to be the deadline for checking whether the relevant signal initiates a cycle of the VESA device. For example, if V3 is selected to be the deadline and the signal VESA-LDEV is not activated by the time point V3, bridge 14 will send signals PCI-FRAME and PCI-IRDY to PCI bus 13. Thereafter, PCI bus 13 sends a signal PCI-DEVSEL (not shown) to acknowledge that the relevant signal initiates a cycle of PCI bus 13. So that CPU 11 can access PCI bus 13, the PCI bus will send a signal PCI-TRDY to terminate the initiated cycle or to inform the CPU that the PCI bus has initiated a cycle. From FIG. 2, it can be observed that eight clock cycles may be required in a conventional system to confirm whether a PCI bus cycle is going to be initiated because bridge 14 cannot output an initiation signal to PCI bus 13 until time point V3 passes. This results in lower bus performance.

Another conventional method has been proposed to improve the performance of the bus. FIG. 3 is a schematic block diagram showing a conventional computer system with the same parallel bus architecture as that shown in FIG. 1 This conventional computer system also includes a CPU 31, a VESA bus 32, a PCI bus 33, a PCI bridge 34, an ISA bus 35, an ISA controller 36, and a main memory 37. Similarly, a PCI bus 33 includes memory segments 331 and 332. However, PCI bridge 34 of this conventional computer system further includes memory holes 341, 342 and comparators 343, 344 which are absent in the aforementioned PCI bridge 14. The memory holes 341 and 342 are a kind of latch circuit and respectively record addresses of memory segments 331 and 332 of PCI bus 33. Using this system, CPU 31 does not have to wait until time point V1, V2 or V3 passes to initiate a cycle of PCI bus 33. As described previously in reference to FIG. 2, CPU 31 first confirms that a cycle of main memory 37 is not going to be initiated. Then, the address sent from CPU 31 is compared with the addresses stored in memory holes 341 and 342 by comparators 343 and 344.

If the address is confirmed to be for the memory segment 331 or 332, it is assured that the signal initiates a cycle on PCI bus 33, as shown in FIG. 4. This method of identifying a bus memory region is called the hole method. Utilizing the hole method, CPU 31 does not have to wait until time points V1, V2 or V3 pass to initiate a cycle on PCI bus 33 which results in only six clock cycles for PCI bus confirmation. Therefore, compared with the first conventional method, two clocks are obviated in the hole method and the bus performance is improved. Although the hole method can improve the PCI bus performance, the method still has shortcomings which are described below.

In the hole method, the address of the memory segments is recorded in the memory holes and inputted by the BIOS or a specific driving program. In the above description, it was assumed that there were only two groups of memory segment addresses on PCI bus 33. If the addresses were A and B, the addresses recorded in the holes would also be A and B. Because some manufacturers have a different memory programming procedures for the second card, the memory segment addresses may be A and C, instead of A and B. However, this change may not be recognized by a user unless the user is quite familiar with the architecture of the computer system. If the change is not noticed, the addresses stored in the memory holes will still be A and B. Consequently, the system will not consider the address C to specify a memory segment on the PCI bus. Thus, all address signals C for initiating the corresponding cycles of the PCI bus are missed and will take more clock cycles to confirm.

Even a user who knows the computer architecture has to know how many memory segments the PCI bus has and has to then change the addresses stored in the holes through software. In the present day plug and play systems, the most important consideration is that the user does not have to thoroughly understand the operation of the computer system to keep the operation of the computer system running smoothly or to get increased performance. The hole method is also not that practical because of the need of software support to change the hole addresses.

In addition, the number of the memory segments on the PCI bus needs to be increased with each extra card that is added. Again, suppose there are two cards and two corresponding memory segment addresses A and B on the PCI bus initially. If a third card is added, the memory segments on the PCI bus will be increased but the two holes and two comparators in the PCI bridge will be insufficient for identifying signals for initiating cycles of the additional memory segment. This results in signals being missed and, thus, more clock cycles to confirm these signals. In order to prevent missing signals that initiate cycles of memory segments, more holes and comparators must be added to the PCI bridge. However, the cost of the PCI bridge will be raised accordingly.

SUMMARY OF THE INVENTION

An object of the present invention is to provide a method and a device for automatically identifying a bus memory region to enhance the performance of the bus.

Another object of the present invention is to provide a software-free method for identifying a bus memory region and a device for implementing the method which matches the goals of a plug-and-play system.

Another object of the present invention is to provide a method and a device for identifying various numbers of memory segments with a lower cost than conventional methods.

In accordance with the present invention, a method for identifying a memory region of a bus includes the steps of: a) identifying first signals that initiate a bus cycle, the first signals specifying a first address in the memory region; b) storing the first address as a reference address for the memory region; c) receiving second signals specifying an operation and a second address; d) comparing the second address with the reference address; and e) proceeding with the operation on the bus if the comparing step confirms the second address references the memory region.

In accordance with another aspect of the present invention, the second address is confirmed to reference the bus memory region when the difference between the second address and the reference address is not greater than a reference value. The second address is confirmed not to reference the bus memory region when the difference is greater than the reference value.

In accordance with another aspect of the present invention, if the comparing step does not confirm the second address references the memory region, the method includes the steps of determining that the second signals initiate a bus cycle; storing the second address as the reference address; and repeating steps c)–e) for third signals.

In accordance with another aspect of the present invention, the method further includes before step a), the step of determining whether the first signals initiate a bus memory cycle.

In accordance with another aspect of the present invention, the operation in step e) may specify a process in which data is written into a buffer and then transmitted from the buffer into the memory region that the second address references. The operation in the step e) may also specify a process in which data stored in the memory region that the second address references is to be read or a process in which a signal is to be inputted to the memory region that the second address references.

In accordance with another aspect of the present invention, the bus memory region includes at least one bus memory segment. The bus may be a Peripheral Component Interconnect bus, a Video Electronics Standards Association bus or an Industry Standard Architecture bus. Additionally, the bus memory region may include at least one bus memory segment.

In accordance with another aspect of the present invention, a device for identifying a bus memory region includes a bus-cycle discriminator that identifies signals that initiate bus cycles; a latch that stores a first address to serve as a reference address if the signals specifying the first address are identified as initiating a bus cycle; a comparing device that receives a second address to determine the difference between the second address and the reference address; and a controller that allows the CPU to proceed with an operation specifying the second address if the difference indicates the second address references the bus memory region.

In accordance with another aspect of the present invention, the comparing devices store a reference value and the difference indicates the second address references the bus memory region if the difference is not greater than the reference value. If the difference is greater than the reference value, the difference indicates the second address does not reference the bus memory region.

In accordance with another aspect of the present invention, the latch stores the second address as the reference address if the difference does not indicate the second address references the bus memory region and signals specifying the second address are identified as initiating a bus cycle. The device further includes a discriminator that identifies signals that initiate a bus memory cycle.

In accordance with another aspect of the present invention, the bus-cycle discriminator, the latch, the comparing device, the controller, and the discriminator are mounted in a bridge.

In accordance with another aspect of the present invention, the bridge further includes a first buffer storing data to be written to the bus memory region that the second address references. The operation may specify a process in which the data is written into the first buffer and then the controller enables the data to be transmitted from the first buffer into the bus memory region that the second address references. Additionally, the first buffer may be a post write buffer.

In accordance with another aspect of the present invention, the bridge further includes a second buffer storing data to be read from the bus memory segment that the second address references. The operation may specify a process in which the data stored in the bus memory region that the second address references to be read into the second buffer. Additionally, the second buffer may be a prefetch buffer.

The present invention may be more thoroughly understood by referring to the following description and the accompanying drawings.

DETAILED DESCRIPTION OF PREFERRED EMBODIMENTS

The present invention will now be described more specifically with reference to the following specific embodiments. The descriptions of specific embodiments of this invention are presented herein for purpose of illustration and example only. The present invention is not limited to the precise embodiments disclosed.

Figure 1:
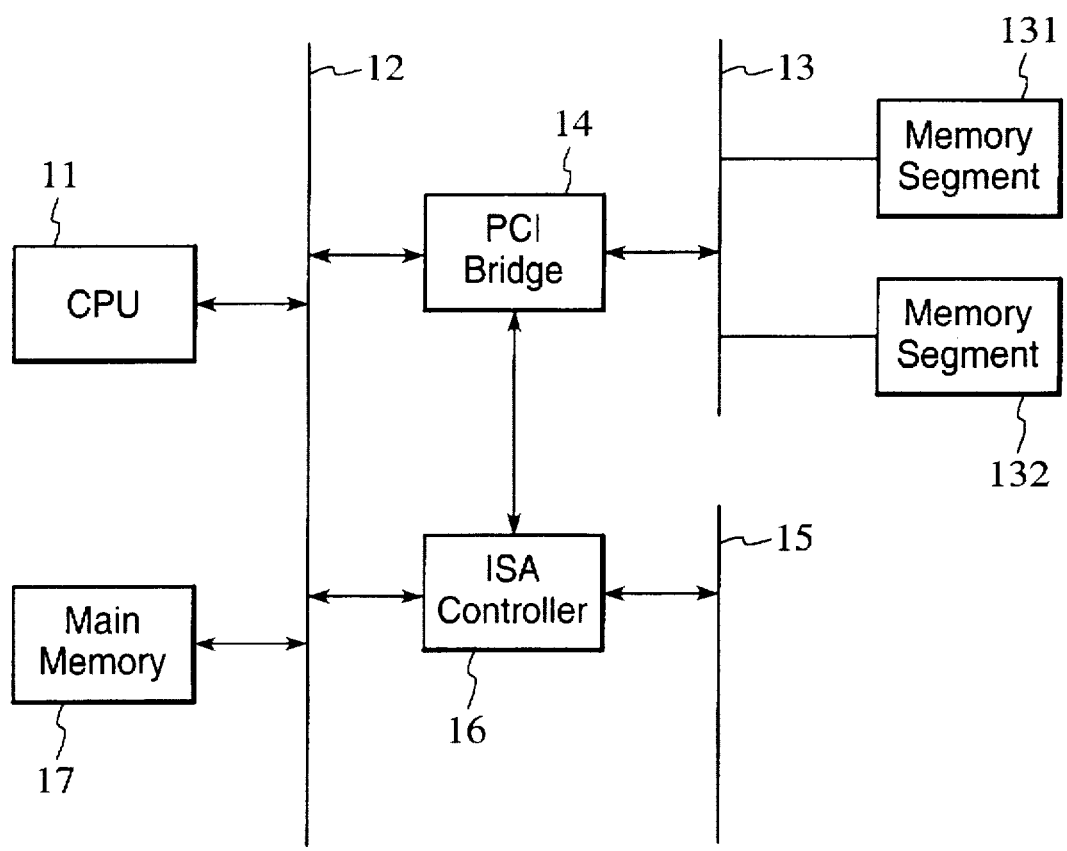
FIG. 1 is a schematic block diagram showing a conventional parallel bus personal computer system.
Figure 2:
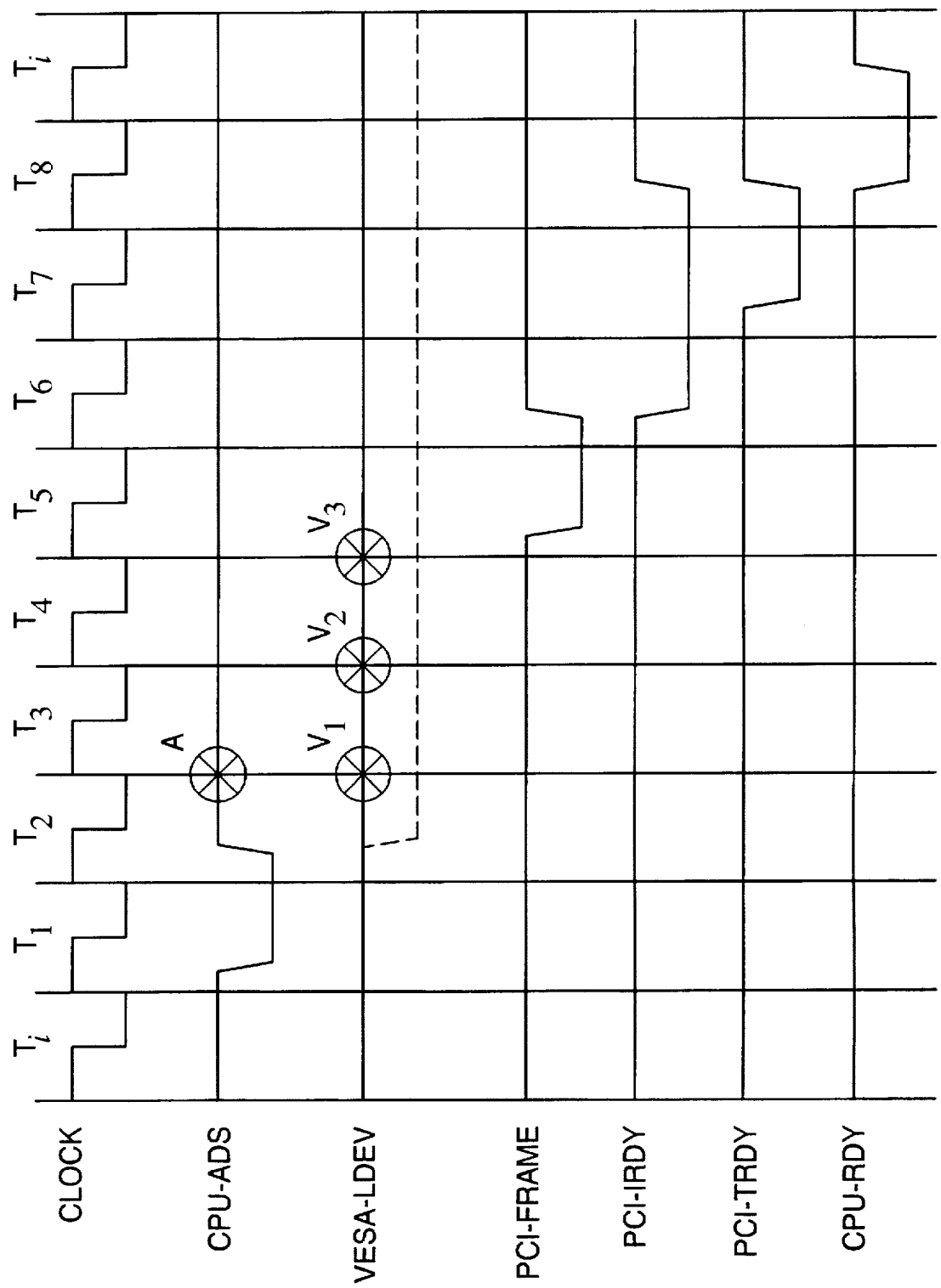
FIG. 2 is a timing diagram showing signals transmitted from the CPU or the PCI bus when the CPU is going to initiate a cycle of the PCI bus in the computer system of FIG. 1.
Figure 3:
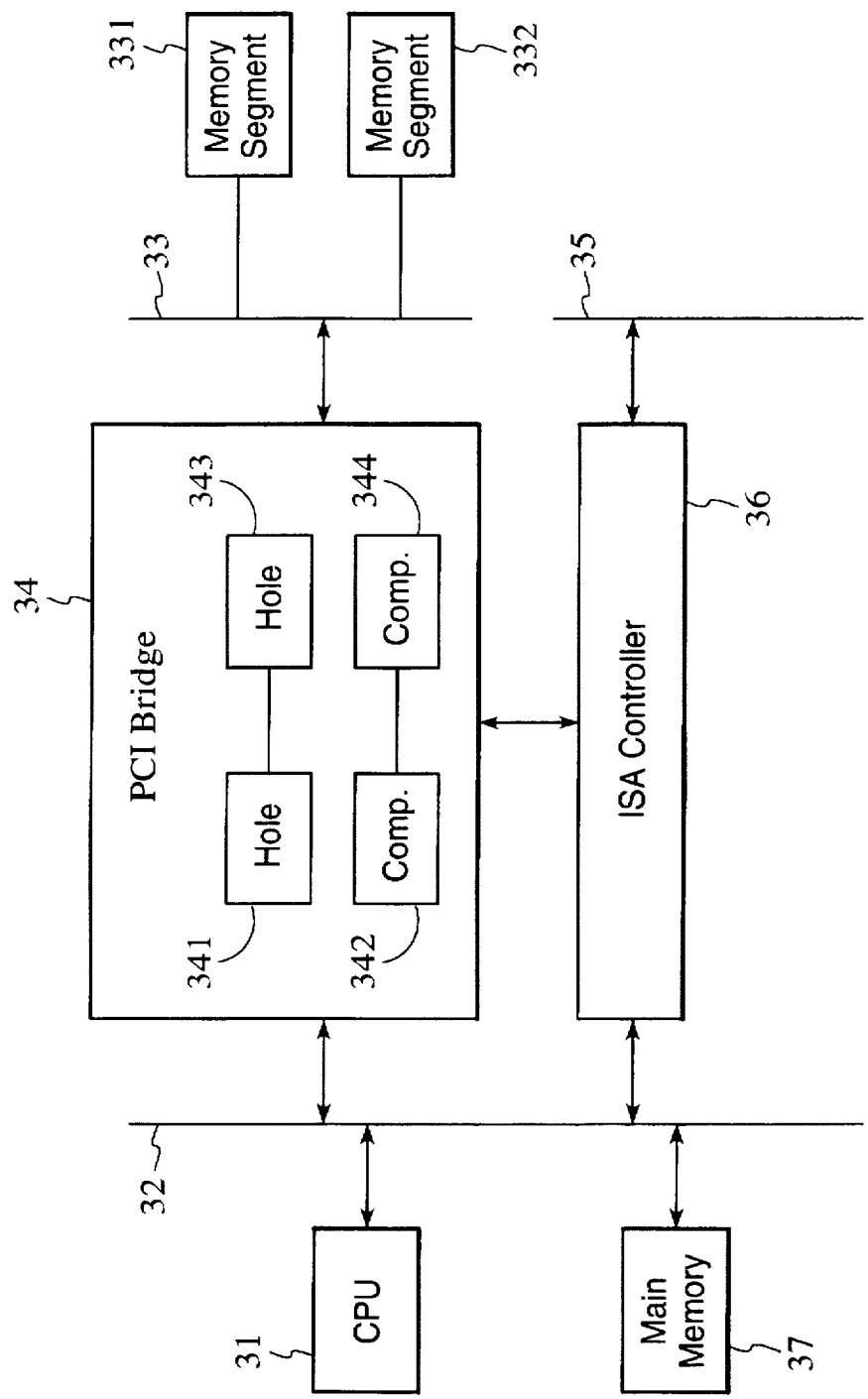
FIG. 3 is a schematic block diagram showing another conventional parallel bus personal computer system.
Figure 4:
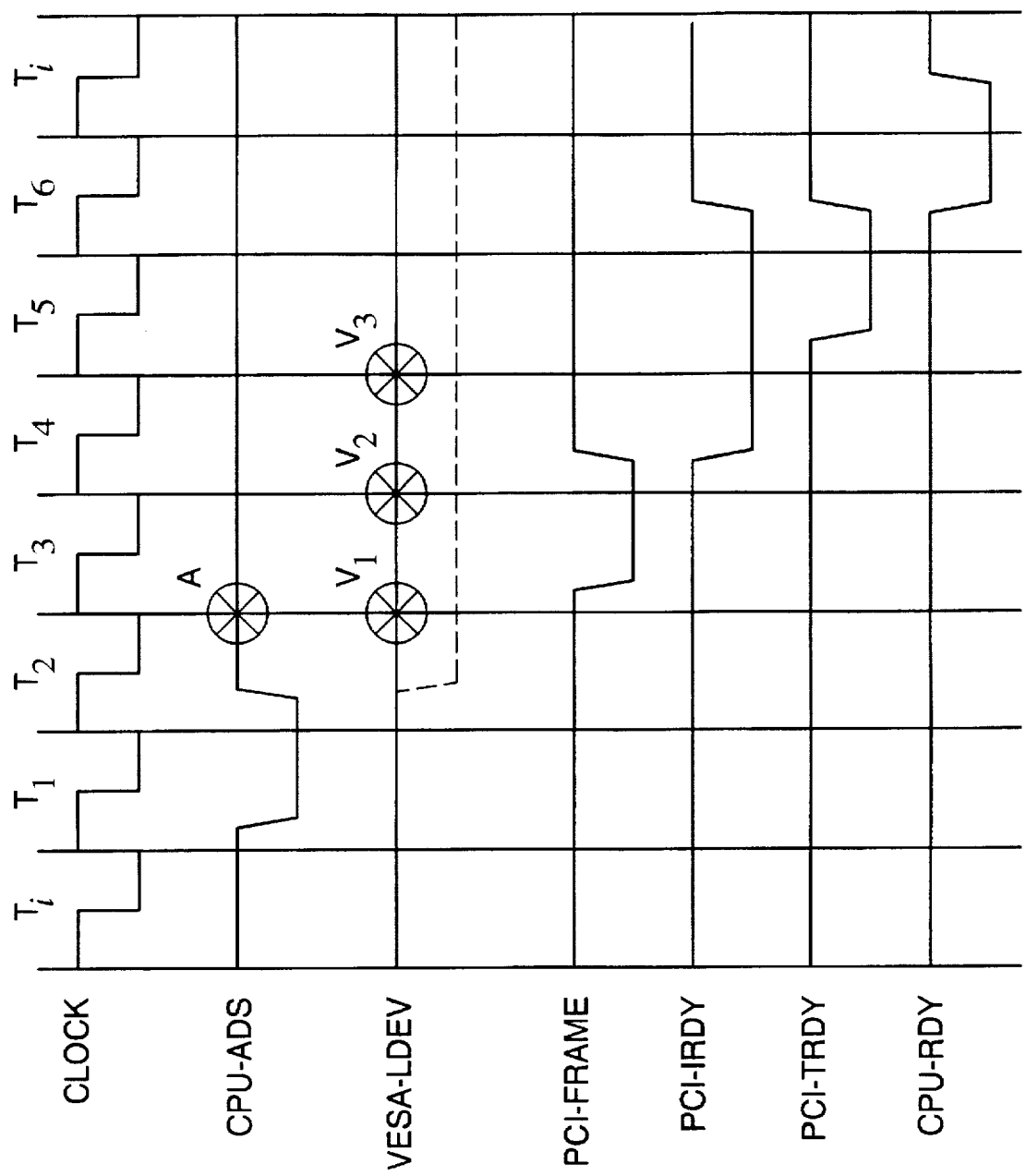
FIG. 4 is a timing diagram showing signals transmitted from the CPU or the PCI bus when the CPU is going to initiate a cycle of the PCI bus in the computer system of FIG. 3.
Figure 5:
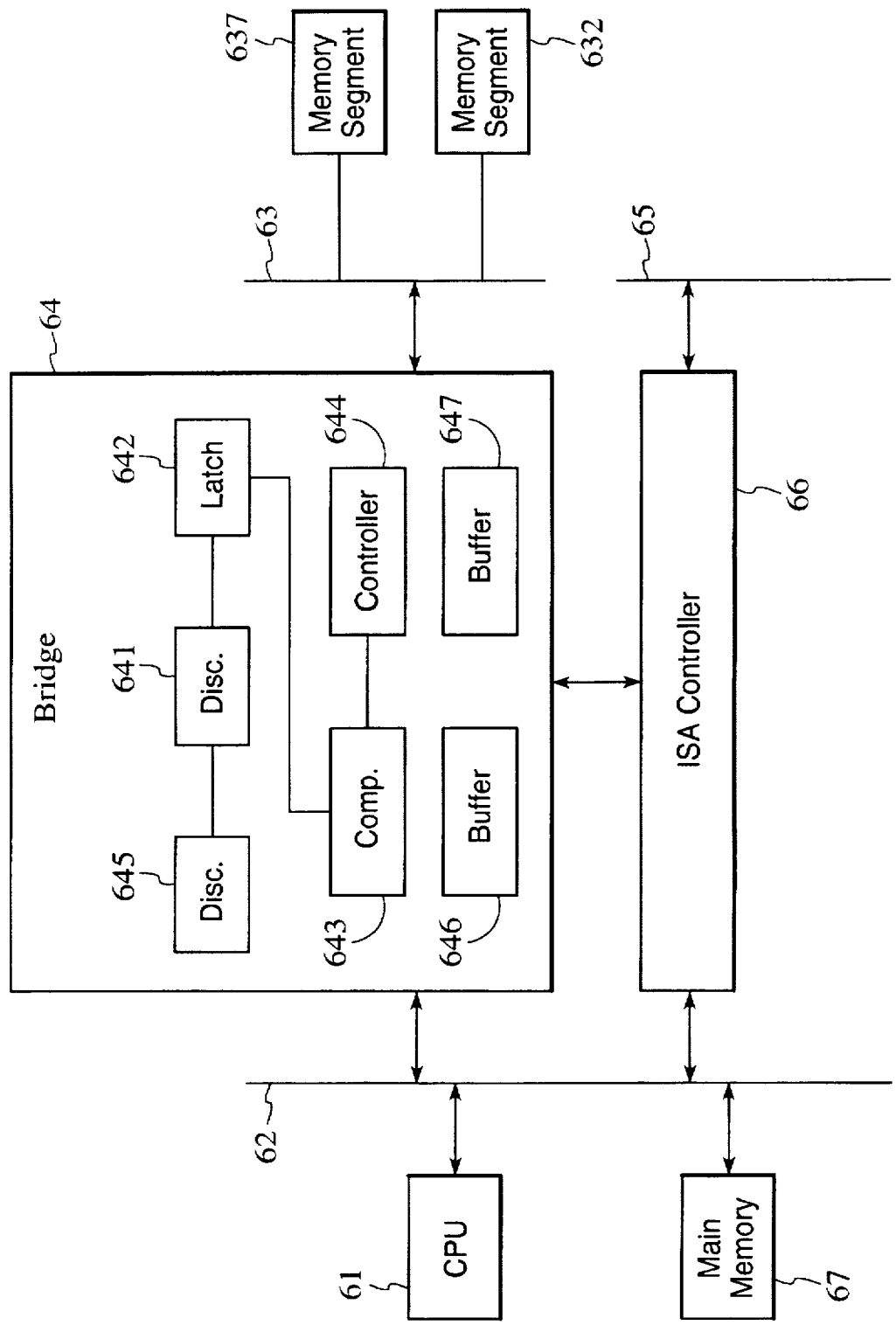
FIG. 5 is a schematic block diagram showing a parallel bus personal computer system according to the present invention.

FIG. 5 is a schematic block diagram showing a computer system with a parallel bus architecture according to the present invention. As shown in FIG. 5, the computer system includes a CPU 61, a VESA bus 62, a PCI bus 63 having memory segments 631 and 632, a bridge 64, an ISA bus 65, an ISA controller 66 and a main memory 67. Bridge 64 includes a bus-cycle discriminator 641 which identifies signals that initiate a bus cycle, a latch 642 which receives and retains a first address to serve as a reference address if the signals are identified as initiating the bus cycle, a comparing device 643 which stores a reference value and receives a second address to determine whether the difference between the second address and the reference address is within the reference value, a controller 644 which allows CPU 61 to proceed with an operation for the bus memory region when the difference is not greater than the reference value and has the latch 642 retain the second address replacing the first address as a new reference address when the difference is greater than the reference value, and a discriminator 645 which identifies signals that initiate a bus memory cycle. In addition, the bridge 64 further includes a post write buffer 646 and a prefetch buffer 647.

Figure 6:
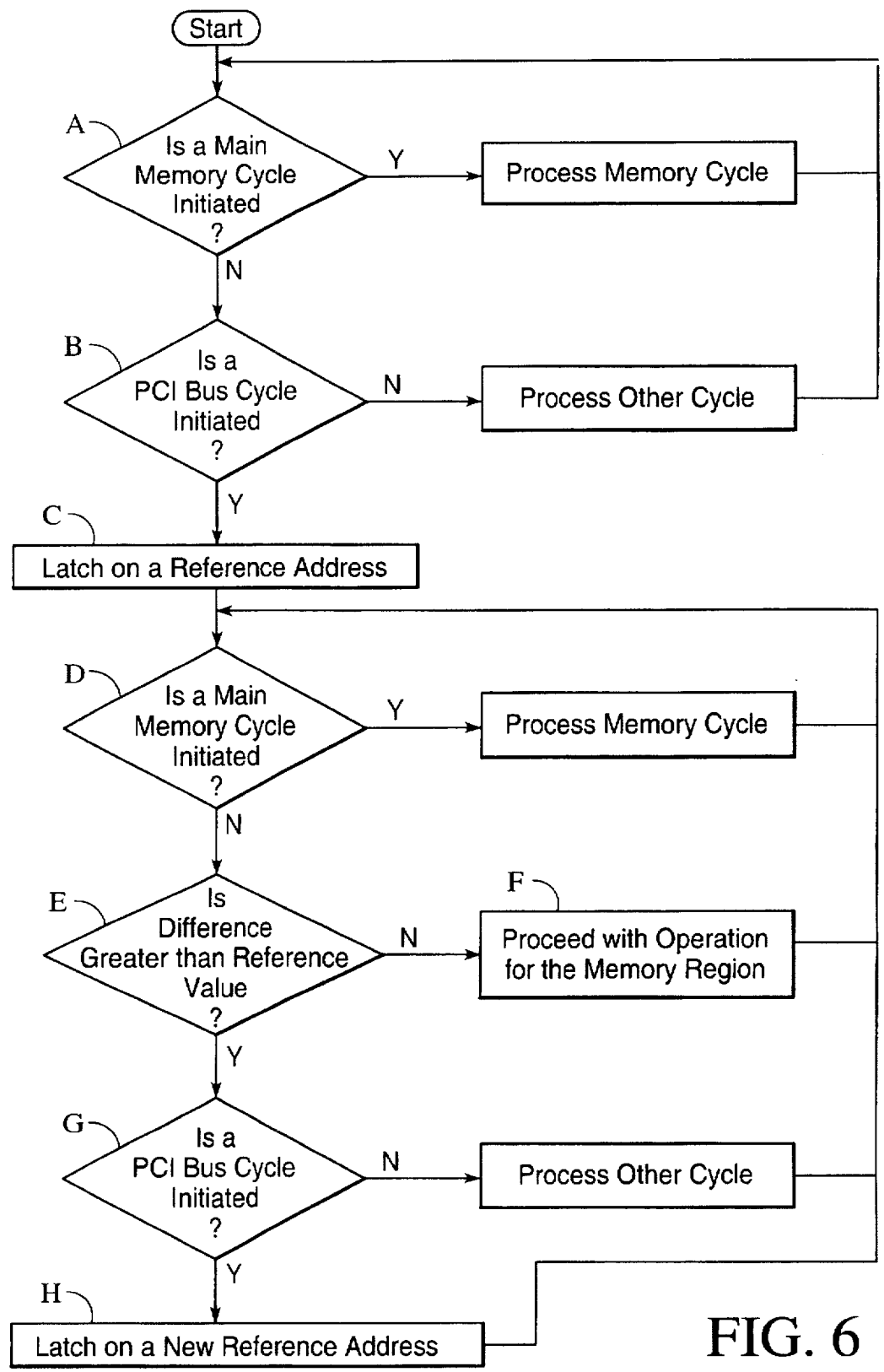
FIG. 6 is a flowchart showing a method of identifying a bus memory region according to the present invention.

FIG. 6 is a flowchart showing a method of identifying a bus memory region according to the present invention. As an example, a cycle of the PCI bus to be initiated will be described in reference to FIGS. 5 and 6 as follows:

Step A: Discriminator 645 determines if first signals specifying a first address and outputted by CPU 61 initiate a main memory cycle;

Step B: Bus-cycle discriminator 641 determines if the first signals outputted by CPU 61 initiate a PCI bus cycle since it is already known that the first signals do not initiate a main memory cycle;

Step C: Latch 642 retains the first address to serve as a reference address;

Step D: Discriminator 645 determines if second signals specifying a second address and outputted by CPU 61 initiate a main memory cycle;

Step E: Comparing device 643 stores a reference value and receives the second address to determine whether the difference between the second address and the reference address is within the reference value;

Step F: If the difference is not greater than the reference value, controller 644 allows CPU 61 to proceed with an operation for the memory region of the PCI bus specified by the first and second address;

Step G: If the difference is greater than the reference value, bus-cycle discriminator 641 determines if the second signals outputted by CPU 61 initiate a PCI bus cycle since it is already known that the second signals do not initiate a main memory cycle; and Step H: Latch 642 retains the second address replacing the first address as a new reference address.

The so-called "operation" may refer to a process in which CPU 61 writes data into a bus memory segment specified by the second address. The data may be temporarily stored in post write buffer 646 and then written to the bus memory segment by controller 644. As long as the number of clocks required for determining whether the signals initiate a PCI bus cycle is reduced, the time period for CPU 61 to send data to post write buffer 646 can be shortened and the time duration the data stays in the post write buffer is thus prolonged. In this manner, PCI bridge 64 will have enough time to determine whether the data residing in the post write buffer has continuous addresses. If so, PCI bridge 64 may initiate a burst cycle to significantly enhance the data-transmission performance of the bus. The advantages of burst cycles are known to persons with skill in the art. The so-called "operation" may also refer to a process in which CPU 61 reads data stored in a bus memory segment specified by the second address. Controller 644 writes the data into prefetch buffer 647 and then CPU 61 reads the data out of the prefetch buffer. Additionally, the so-called "operation" may refer to a process in which CPU 61 sends a signal to the bus memory segment specified by the second address to operate peripheral equipment.

A numerical example will now be described for illustrative purposes. Assume that the PCI bus originally has two memory segments which respectively correspond to address values 0–100 and 120–220 and the reference value for calculating an address range is 50. Because the operating system is standardized, the bus memory cycles the CPU initiates are generally in a region of continuous addresses. If the value of the first address is 0 and the value of the second address is 1, the absolute value of the difference between the first and the second addresses, 0 and 1, is less than 50. Thus, it is confirmed that the signal corresponding to the second address initiates a PCI bus cycle and that operation proceeds.

If the value of the second address is 51, the absolute value of the difference between the first and the second addresses, 0 and 51, is greater than 50. Thus, a verification step is required to confirm whether the signal corresponding to the second address initiates a PCI bus cycle. Assuming it does, the second address will be latched and the value of the reference address will be changed to 51. If the value of the next address is 52, the absolute value of the difference between the first and the second addresses, 51 and 52, is less than 50 so the signal corresponding to the second address initiates a PCI bus cycle and that operation proceeds.

Now assume the address values of the first memory segment in the PCI bus are changed from 0–100 to 340–440. If the value of the next address outputted by CPU 61 is 340, the absolute value of the difference between the first and the second addresses, 51 and 340, is greater than 50. Once the signal corresponding to the second address is confirmed to initiate a PCI bus cycle, the second address is latched and the value of the reference address is changed to 340. If the next address value is 341, the absolute value of the difference between the first and the second addresses, 340 and 341, is less than 50 so the operation initiates a PCI bus cycle.

Unlike the conventional hole method, a system according to the present invention need not be modified when the address values of a memory segment in the PCI bus are changed (e.g., from 0–100 to 340–440). In the hole method, the addresses stored in the holes have to be changed to avoid missing (i.e., early detection) the signals for the address values 340–440 outputted from the CPU which initiate a PCI bus cycle. In the present invention, however, only the first cycle corresponding to the address value 340 will be missed and the rest of the cycles corresponding to the other addresses will be detected early and proceed. Therefore, no matter how the memory segments in the PCI bus change, the present invention will not miss all the cycles for a memory segment.

Figure 7:
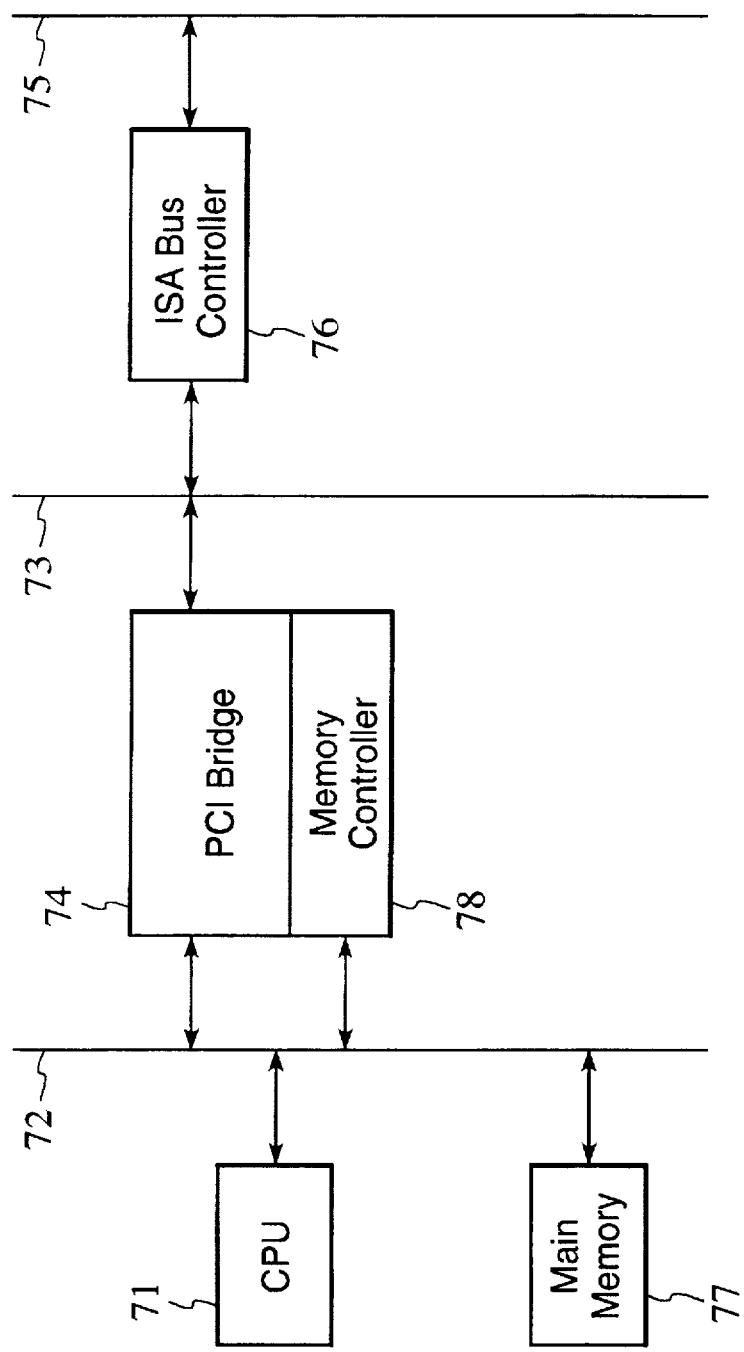
FIG. 7 is a schematic block diagram showing a cascade bus personal computer system.

Of course, the present invention is not limited to computer systems with a 486 CPU but can also be used in computer systems with various other CPUs, including the pentium CPU. Additionally, the present invention may be applied to a computer system with a cascade bus architecture. A personal computer system with a cascade bus architecture is schematically shown in FIG. 7 which includes a CPU 71, a VESA bus 72, a PCI bus 73, a PCI bridge 74, an ISA bus 75, an ISA bus controller 76, a main memory 77, and a memory controller 78. The present invention is applied to the computer system with a cascade bus architecture in the same way as it is applied to a parallel bus architecture as shown in FIGS. 5 and 6. The operation of computer systems with a cascade bus architecture is well known to those skilled in the art.

The present invention and the conventional hole method can both reduce the time required to identify the bus memory region which enhances the performance of the PCI bus. Utilizing either one of the methods, the CPU does not have to wait until the time point V1, V2 or V3 passes to initiate a cycle of the PCI bus. However, the present invention differs from the hole method in that a second address is compared with reference information to determine whether it specifies memory segments of the PCI bus and thus whether the corresponding signal initiates a PCI bus cycle. The present method also provides the following advantages:

1. If the memory segments of the relevant PCI bus change, a computer system utilizing the present invention need not be modified to avoid missing all cycles corresponding to a memory segment as in the hole method. In other words, the present invention monitors the bus memory region in a dynamic manner so that no matter how the memory segments change, all cycles corresponding to a memory segment will not be missed.

2. The present method is achieved through hardware rather than software so the user does not have to be familiar with the operating system to efficiently maintain the computer system. Thus, the present invention is consistent with a plug-and-play system.

3. When the number of the memory segments of the PCI bus increases, the identification procedure of the present invention can still proceed without any modification of the hardware. This may be contrasted with the hole method where a number of holes and comparators must be added to match the number of memory segments of the bus. For example, if the number of the memory segments is increased to N, the number of holes and comparators required must also be increased to N. The present invention does not require any additional hardware. Thus, the present invention is more cost-effective than the hole method for the same number of memory segments.

In conclusion, the present invention efficiently enhances the bus performance. Furthermore, the present method is cost effective and is suitable for plug-and-play systems.

While the invention has been described in reference to specific embodiments, the present invention is not limited to the disclosed embodiments. For example, the present invention has been described as identifying a bus memory region in a PCI bus. However, the present invention may also be utilized with other buses like VESA, ISA, and the like. Therefore, various modifications, alternative constructions, and equivalents may be used within the spirit and scope of the invention as defined by the appended claims.

What is claimed is:

1. In a computer system, a method for identifying a memory region of a bus comprising the steps of:

a) identifying first signals that initiate a bus cycle, said first signals specifying a first address in said memory region;

b) storing said first address as a reference address for said memory region;

c) receiving second signals specifying an operation and a second address;

d) comparing said second address with said reference address;

e) proceeding with said operation on said bus if said second address is within an address range on either side of said reference address;

f) verifying said second address references said memory region if said comparing step does not determine said second address references said memory region by determining that said second signals initiate a bus cycle storing said second address as said reference address so that said second address places said first address as said reference address; and repeating the steps c)–e) for third signals.

2. The method according to claim 1 wherein said comparing step includes the step of obtaining an absolute value difference between said second address and said reference address as said address range.

3. The method according to claim 2 wherein said second address is determined to reference said memory region if said difference is not greater than a reference value.

4. The method according to claim 2 wherein said second address is determined not to reference said memory region if said difference is greater than a reference value.

5. The method according to claim 1 wherein step a) further comprises the step of determining whether said first signals initiate a bus memory cycle.

6. The method according to claim 1 wherein said operation specifies a process in which data is written into a buffer and then transmitted from said buffer into said memory region that said second address references.

7. The method according to claim 1 wherein said operation specifies a process in which data stored in said memory region that said second address references is to be read.

8. The method according to claim 1 wherein said operation specifies a process in which a signal is to be sent to said memory region that said second address references.

9. The method according to claim 1 wherein said bus is a Peripheral Component Interconnect bus, Video Electronics Standards Association bus, or Industry Standard Architecture bus.

10. The method according to claim 1 wherein said memory region includes at least one bus memory segment.

11. The method according to claim 1 wherein said method is used for data manipulation in a computer system.

12. In a computer system, a method for identifying a memory region of a bus comprising the steps of:

storing as a reference address a first address within said memory region other than a starting address of said memory region;

receiving signals specifying an operation and a second address;

calculating a difference between said second address and said reference address;

proceeding with said operation on said bus if said difference is less than a reference value; and storing said second address as said reference address if said difference is at least as great as said reference value and said second address is within said memory region.

13. The method according to claim 12 further comprising the step of identifying said first address as specifying said memory region.

14. The method according to claim 12 wherein said difference is an absolute value difference.

* * * * *